United States Patent [19]
Zugravu

[11] Patent Number: 5,840,172
[45] Date of Patent: Nov. 24, 1998

[54] DIRECT CURRENT HYDROGEN GENERATOR, SYSTEM AND METHOD

[75] Inventor: George Zugravu, Methuen, Mass.

[73] Assignee: Whatman Inc., Haverhill, Mass.

[21] Appl. No.: 823,987

[22] Filed: Mar. 25, 1997

[51] Int. Cl.$^6$ .............................. C25B 15/00; C25B 1/02
[52] U.S. Cl. .................... 205/639; 204/228; 204/229; 204/230; 205/335; 205/337; 205/637; 205/638
[58] Field of Search ................................. 205/335, 337, 205/637, 638, 639; 204/291, 228, 229, 230

[56] References Cited

U.S. PATENT DOCUMENTS

| | | | |
|---|---|---|---|
| 3,448,035 | 6/1969 | Serfass | 204/278 |
| 3,870,616 | 3/1975 | Dempsey et al. | 204/230 |
| 4,078,985 | 3/1978 | Takeuchi | 204/230 |
| 4,822,469 | 4/1989 | Shimomura et al. | 204/230 |
| 5,037,518 | 8/1991 | Young et al. | 204/230 |
| 5,480,518 | 1/1996 | Shane et al. | 204/129 |

Primary Examiner—Bruce F. Bell
Attorney, Agent, or Firm—Richard P. Crowley

[57] ABSTRACT

The invention relates to an ultra-high purity gas generator system, such as a hydrogen gas generator system and method, which employs a direct current source to supply proportional electrical current to a cathode in an electrolyte cell. The system comprises a metal cathode gas generator for hydrogen gas and a DC current for the metal cathode, wherein the output DC line current is continuously modified by a control circuit, which modifies the pulse width into the DC source, based on the variation in hydrogen gas pressure or flow from the cell. In the system and method, direct current is supplied to the palladium or palladium alloy cathode of an electrolytic cell, and the direct current is controlled or switched by monitoring the gas flow or pressure in the cell by a pressure or flow transducer, providing the output voltage to a control circuit. The control circuit modulates the width of the pulses of a high frequency inverter and its modified and filtered output is supplied to the cell as a proportional, continuous straight line current source.

10 Claims, 2 Drawing Sheets

DIRECT CURRENT HYDROGEN GENERATOR, SYSTEM AND METHOD

BACKGROUND OF THE INVENTION

Ultra-high purity hydrogen (e.g., 99.999% pure), is produced by activating a palladium or palladium alloy cathode in an electrochemical cell to dissociate /water and provide a hydrogen proton (see U.S. Pat. No. 3,448,035 hereby incorporated by reference). In such high purity generators, water is electrolyzed and hydronium ions are reduced at the palladium cathode tube and end up as hydrogen gas (99.999% pure) on the inside of the palladium tube. By monitoring the generator output, gas flow or pressure; and adjusting the energy supplied to the electrolysis cell by an AC power source, the hydrogen output pressure, and implicitly the output flow rate of the hydrogen, is controlled.

Other methods of producing hydrogen employ a solid polymer electrolyte in an ion exchange process, or an ion exchange membrane to produce oxygen-hydrogen (see U.S. Pat. No. 5,037,518 and U.S. Pat. No. 5,480,518, both patents hereby incorporated by reference). However, these processes do not produce ultra-high purity hydrogen in a single step, since the hydrogen is produced with water vapor, which must be removed, typically, in a downstream purifier containing silica gel or a palladium membrane.

It is desirable to provide for a new and improved, single step, closed loop gas generator system, such as a hydrogen electrolytic cell generator system and method, with increased hydrogen purity and efficiency.

SUMMARY OF THE INVENTION

The invention relates to an ultra-high purity gas generator system, such as a hydrogen gas generator system and method, which employs a direct current source to supply proportional electrical current to a cathode in an electrolytic cell.

The system comprises a metal cathode gas generator for hydrogen gas and a DC current supply for the metal cathode, wherein the output DC line current is continuously modified by a control circuit, which modifies the pulse width into the DC source based on the variation in hydrogen gas pressure or flow from the cell.

In the system and method, direct current is supplied to the palladium or palladium alloy cathode of an electrolytic cell, and the direct current is controlled or switched by monitoring the gas flow or pressure in the cell by a pressure or flow transducer, and providing the output voltage to a control circuit. The control circuit modulates the width of the pulses of a high frequency inverter, and its modified and filtered output is supplied to the cell as a continuous straight line current source.

The invention comprises a system, which comprises:

a) a high purity gas, e.g. hydrogen producing, water dissociating electrolytic cell, which includes a gas producing cathode, such as palladium or an alloy to which direct current electrical power is supplied, the cell having an outlet to recover ultra-high purity gas, such as hydrogen;

b) a pressure or flow transducer means to monitor the hydrogen gas pressure or flow of the cell, and to supply a proportional voltage pressure or flow rate output;

c) an AC power source to supply AC power;

d) an AC input rectifier and filter means to rectify and filter the AC current of the AC source to DC current;

e) a high frequency inverter means to convert the DC current from the AC input rectifier and filter means to a selected high frequency output, e.g., 20 to 100 kilohertz e.g., 20 to 40 kHz;

f) a DC output and rectifier means to provide selected, continuous DC current to the cathode of said cell;

g) control circuit means, which includes a pulse width modulator, and wherein the control circuit means receives said voltage output from the transducer means, controls the selected DC current to the cathode of said cell in response to said transducer voltage output by varying the width of the electrical pulse signal sent to the high frequency inverter means, thereby efficiently adjusting the direct current to the cathode of the cell responsive to the gas flow rate or pressure.

The system and method provides an improved economic cell generator, since the selected continuous DC current power curve supplied to the cell in the system permits a smaller cathode tube, e.g. 1/8" in diameter, rather than 1/4" in diameter, to be used to provide more effective cell surface area in the same cell volume and to use less expensive palladium metal.

While the closed loop DC continuous system and method is described in connection with the particular embodiment of the production of ultra-high purity hydrogen in an electrolytic cell, such system and method may be usefully used in connection with the production of other hydrogen generators, such as solid polymer electrolyte generators, and other electrically generated gas generators.

DESCRIPTION OF THE EMBODIMENTS

Figure 1:
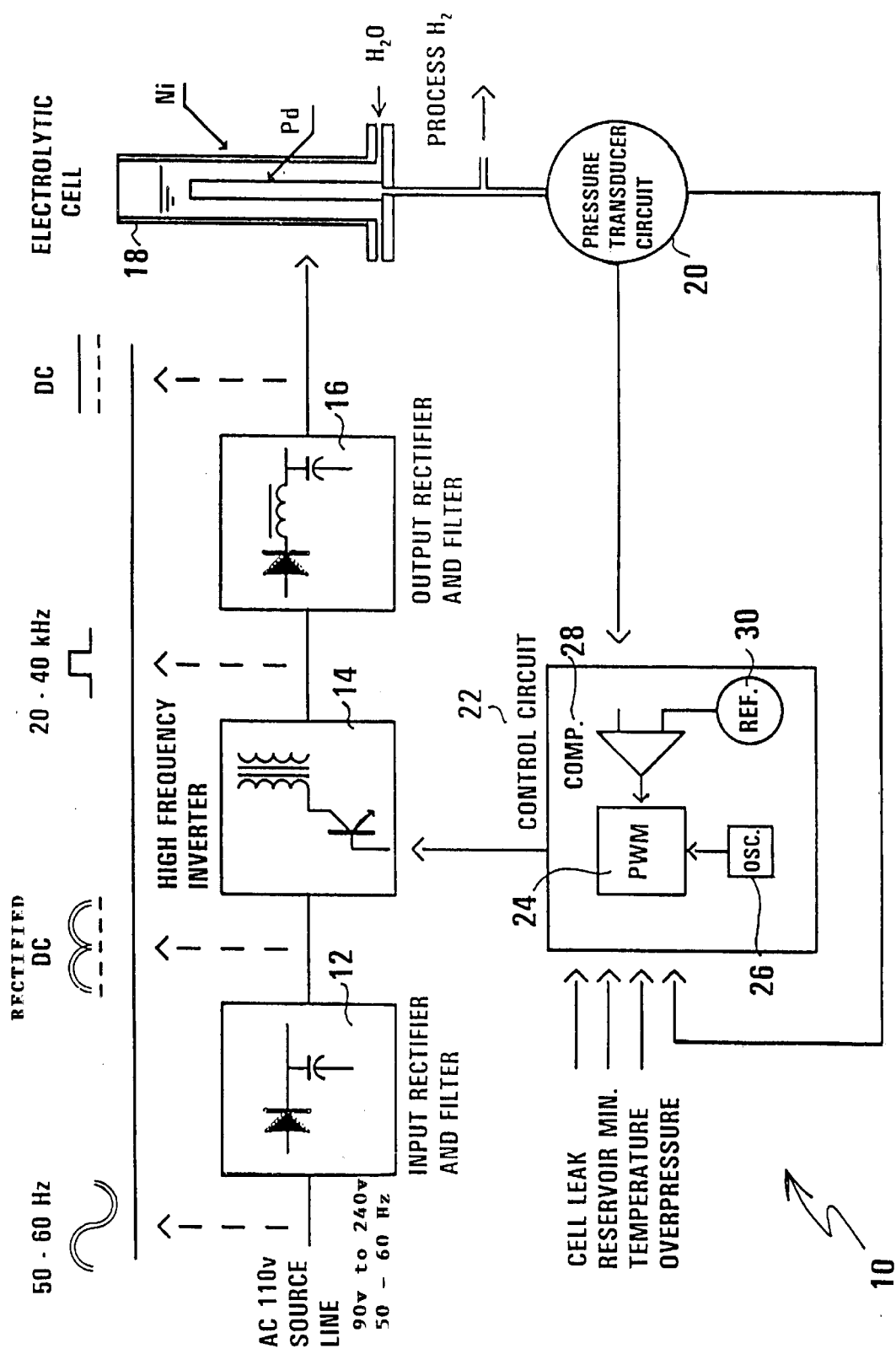
FIG. 1 is a schematic illustrative block diagram of the system of the invention.

The system 10 of the invention is shown in the drawing of FIG. 1. The system 10 comprises an AC input rectifier and filter 12 to convert the 50 to 60 Hz 90 v to 240 v AC power supply from the source line into a rectified DC output to a 40 to 100 kHz high frequency inverter 14, which reduces the rectified direct current output, with the pulse width modulation (PWM) output level required by the user's circuitry to a DC output rectifier and filter 16, wherein continuous direct current is supplied to an electrolytic cell 18. The cell 18 having a metal nickel housing, and having a plurality of palladium cathode tubes, and supplied with electrolyte, to provide a very high purity hydrogen gas. The system includes a pressure transducer 20 to monitor the hydrogen gas pressure output of the cell 18 and to provide a proportional output signal, e.g. voltage, to a control circuit 22 with an electrical signal output into the high frequency inverter 14.

The control circuit 22 closes the loop with its signal output into the inverter 14. The control circuit 22 includes a pulse width modulator 24 (PWM), an oscillator 26, a voltage comparator 28 and a reference 30. The control circuit 22 regulates the selected high frequency inverter DC output to the cell 18 and closes the electrical loop from the output of the inverter 14.

The control circuit 22 generates a selected fixed frequency internally, e.g. 40–100 kHz, and uses the PWM to implement the desired DC output. The on-time of the square drive output of the inverter 14 is controlled by the gas process out voltage as a pressure or flow function for the transducer 20. As the input voltage (flow, pressure) to the control circuit 22 increases, a slight rise in input voltage into the control circuit 22 will signal the control circuit, by the PWM, to deliver narrower pulses in the control circuit 22 output to the inverter 14, and conversely, as the input voltage (flow, pressure) from the transducer 20 decreases, wider pulses will be fed into the inverter 14 to modify the DC output current to cell 18. Generally, the pulse duration will range from about 10 to 25 microseconds ($\mu$s). The system also shows optionally that the control circuit 22 may monitor and control other auxiliary functions of the cell 18 with either power as desired, such as cell leakage, the water use reservoir of cell, the cell temperature and cell overpressure.

Figure 2:
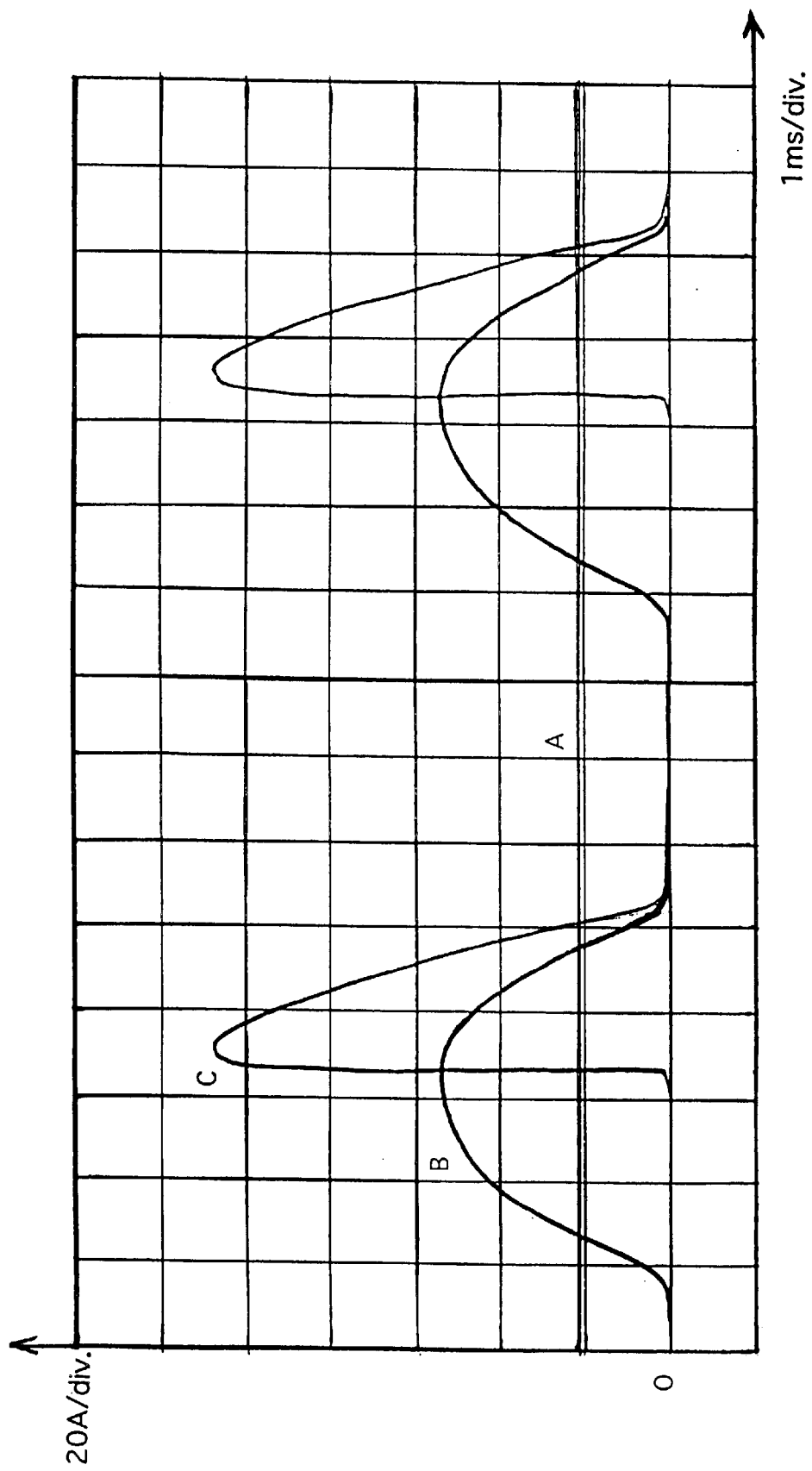
FIG. 2 is a graphical representation of electrical wave function of current, in amps per division vs. time in milliseconds per division, showing AC prior art current output (B and C) in comparison to the invention (A).

FIG. 2 shows a comparison between the current variation in amps per division versus time in milliseconds inclusion of a prior art, commonly used "phase angle" (Curve C) or "amplitude, adjustable rectified DC" (Curve B) power controller for hydrogen cathode cell generators. The intervals of on-current alternate with intervals of no current and the ratio of off/on can be as low as 2. This prior art operation results in a high effective current value that needs to be supplied to the cell. For a given hydrogen gas flow rate, this current value is twice as much as the current value from the direct current power supply system of the invention (see FIG. 2A) where the current line is substantially continuous. The prior art method and systems (FIGS. 2B and C) provide higher cell temperatures, with large intervals of no cathode oxidation reaction and mechanical stress on the cell.

From the flow rate perspective, the continuous direct current surge driven system with the cathode electrolytic cell doubles the hydrogen gas flow rate with no electromechanical stress forces applied to the cathode palladium tubes, provides lower running cell temperature, and complete elimination of those time intervals when the reverse cathode reaction takes place.

What is claimed is:

1. A gas generator system for the generation of a selected gas, by the application of an electrical direct current to an electrolyte in a gas generator cell, which system comprises:
    a) an input rectifier and filter to receive 50 to 60 Hz AC power and to rectify and filter from AC power to a DC power output;
    b) a high frequency inverter to receive the DC power output and provide a high frequency DC power output;
    c) a DC output and rectifier to receive the high frequency DC power output and to provide a continuous DC power to a cathode of a gas generator;
    d) a gas generator with a cathode and having an electrolyte, which cell receives the continuous output DC power and provides for the generation of a high purity gas from a generator output;
    e) a transducer to monitor the gas pressure or gas flow from the gas generator and to produce an electrical voltage signal; and
    f) a control circuit which includes:
        i) a voltage comparison circuit and reference circuit to receive and compare the voltage signal and to provide a voltage control signal; and
        ii) a pulse width modulator (PWM) to receive the control signal and to provide an PWM output signal responsive to the control signal, which PWM signal feedsback to the high frequency inverter to modify the pulse width of the high frequency DC power output to the DC output and rectifier to provide a controlled, pulse-modified, continuous DC power to the cathode of the gas generator.

2. The system of claim 1 wherein the gas generator comprises a water-dissociable palladium cathode gas generator for the production of ultra-high purity hydrogen.

3. The system of claim 2 wherein the gas generator includes a cathode tube having a diameter of about one-eighth (1/8) inch.

4. The system of claim 1 wherein the gas generator comprises a solid polymer electrolyte for the production of hydrogen.

5. The system of claim 1 wherein the high frequency inverter converts the DC power to a high frequency of about 20 to 100 kilohertz DC power output.

6. The system of claim 1 wherein the modified pulse width output has a pulse time of about 10 to 25 microseconds.

7. An ultra-high purity hydrogen gas generator closed loop system, which system comprises:
    a) a hydrogen gas generator cell having an outlet for the withdrawal of a high purity hydrogen gas generated by the application of a direct current to a water electrolyte from a palladium cathode in the gas generator cell;
    b) a transducer means in communication with said outlet to monitor the gas pressure or gas flow of the hydrogen gas from the outlet and to provide a proportional electrical signal;
    c) a 90 V to 240 V, 50 to 60 Hz AC power source to provide AC current;
    d) an AC input rectifier and filter means to rectify and filter the AC current from the AC source to rectified DC current;
    e) a high frequency inverter means to receive said rectified DC current and to convert the rectified DC current to a selected high frequency output to an output rectifier and filter;
    f) a DC output and rectifier means to supply high frequency, continuous, flat-modified DC power to the gas generator cell; and
    g) a control circuit means to include a pulse width modulator to receive said proportional signal from the transducer and to provide a varied pulse width to the high frequency inverter means solely responsive to said proportional signal and thereby to control the DC power supplied to the gas generator cell.

8. A method of providing a high purity gas from a DC electrically powered gas generator having an electrolyte and a gas outlet for the withdrawal of the high purity gas, which method comprises:
    a) providing a source of AC power;
    b) rectifying the AC power to a DC power outlet;
    c) inverting the DC power output to provide a high frequency DC power output;
    d) monitoring the gas outlet for gas pressure or gas flow and producing a voltage signal responsive to such gas pressure or gas flow;
    e) comparing the voltage signal to a reference signal to produce a voltage control signal;
    f) generating a pulse width modulation signal from a pulse width modulator and modifying the pulse width solely in response to the voltage control signal to provide a PWM output signal;
    g) modifying the high frequency DC power output by the PWM output signal to provide a high frequency PWM power output;
    h) rectifying the PWM power output to provide a flat, continuous DC power output; and i) providing the flat, continuous DC power output to the gas generator.

9. The method of claim 8 which includes providing AC power to about 50 to 60 Hertz and increasing the frequency by inverting to a high frequency of about 20 to 100 kilohertz.

10. The method of claim 8 which comprises providing the DC power outlet to an ultra-high purity hydrogen gas generator with a palladium cathode.

* * * * *